April 19, 1960 CHAANG HUANG 2,933,620

TWO-INPUT RING COUNTERS

Filed May 27, 1954 2 Sheets-Sheet 1

INVENTOR
CHAANG HUANG
BY Paul S. Martin
ATTORNEY

INVENTOR
CHAANG HUANG
BY Paul S. [signature]
ATTORNEY

United States Patent Office 2,933,620

Patented Apr. 19, 1960

2,933,620

TWO-INPUT RING COUNTERS

Chaang Huang, Ipswich, Mass., assignor, by mesne assignments, to Sylvania Electric Products Inc., Wilmington, Del., a corporation of Delaware Application May 27, 1954, Serial No. 432,876

8 Claims. (Cl. 307—88.5)

Figure 1:
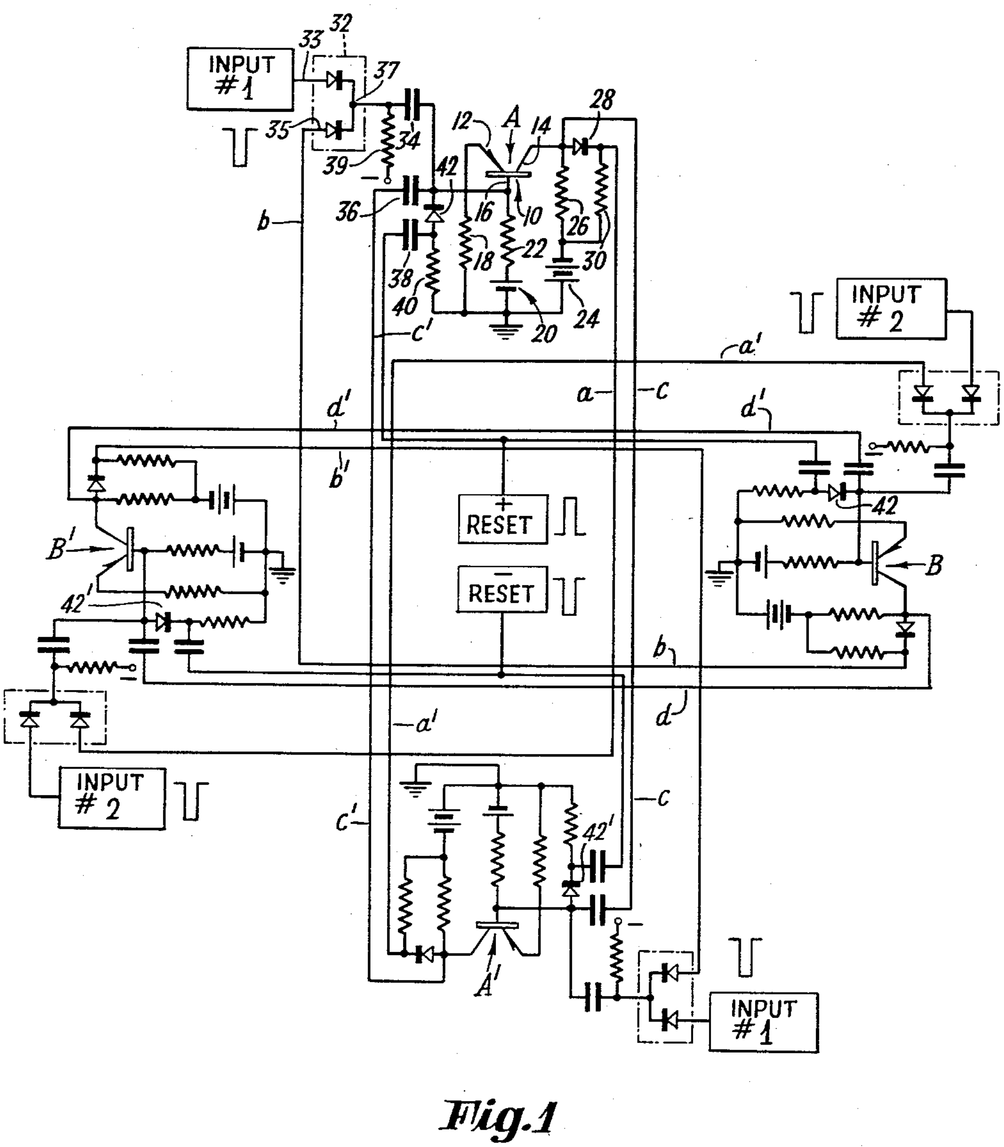

The present invention relates to counting or computing devices, in particular to ring counters.

Ring counters are known employing vacuum tubes and having a number of stages connected in ring fashion. In one widely used form of ring counter, one half of the ring is composed of successive stages in the "off" or "low-conduction" state, and the other half of the ring is composed of successive stages in the "on" or "high-conduction" state. Ordinarily, this ring counter is progressively advanced step-wise in one direction by the signal input such that the first or leading "on" stage is turned "off" concurrent with turning "on" of the first or leading "off" stage. Rotation of the ring counter may be achieved in dependence upon one series of input pulses applied to all of the stages, or two separate and alternating occurring series of input pulses applied to the successive stages in alternation.

A two-input ring counter of this form exhibits the special advantage that its operation does not depend upon the shape and/or duration of the input pulses. This is of importance in a large scale calculator, an inventory control, or a rationalized organization structure, since in each of these applications it is desirable that the circuits be as insensitive as possible to changing values and characteristics of circuit components. Such vacuum tube two-input ring counters with successive stages connected in ring fashion have one of the two independent input signals applied to the even stages, and the other of the two independent input signals applied to the odd stages. These two-input ring counters necessarily incorporate an even number of stages, and are rotated upon occurrence of the alternative series of input pulses.

Numerous difficulties are encountered in design of ring counters with vacuum tubes. Inherently, vacuum tubes are voltage devices and require additional components, such as cathode followers, for the individual stages to provide the power required for the external switching circuits. These external circuits are needed to correlate the switching functions of the respective stages in achieving progressive advance or rotation of the ring counter. Additionally, direct control is precluded, as for resetting or clearing the ring counter. Frequently there is a problem of impedance matching, an important design consideration in vacuum tube circuits. Characteristically, and in marked contrast, bistable transistor circuits are advantageous for the switching functions required in ring counters. Further, these transistor circuits present many desirable qualities in respect to heat dissipation, life, and other considerations promoting more favorable circuit operation, stability and reliability.

It is broadly an object of the present invention to provide novel ring counters which are reliable in achieving the counting function, yet involve relatively simple circuits.

It is another object of the present invention to provide ring counters embodying bistable circuits including current-multiplying transistors. Specifically, it is within the contemplation of the present invention to provide two-input ring counters which incorporate triode or tetrode transistor circuits.

It is a further object of the present invention to provide improved ring counters of the two-input type which are comparatively insensitive to changing values and characteristics.

In accordance with an illustrative embodiment demonstrating certain features and aspects of the present invention, there is provided a two-input ring counter in which the individual stages each include a current-multiplying transistor circuit having a bistable input characteristic with multiple stable-conduction states. An advantageous approach to obtaining the required bistable input characteristic is to employ a linear load in the emitter circuit of the current-multiplying transistor which intersects the emitter-input characteristic to provide two stable operating points. One stable operating point occurs when the emitter current is negative and in a region of positive resistance, designated as the "low-conduction" stable state; and the other stable operating point occurs when the emitter current is positive and sufficient to cause saturation of the collector current in a corresponding region of positive resistance, designated as the "high-conduction" stable state. This simple approach to obtaining the required bistable characteristic is usually adequate for relatively low frequency operation. However, it may be necessary to resort to more complex systems, as for high frequency operation and other considerations. These systems may employ non-linear loads in the emitter circuit, as disclosed in my copending application, Serial No. 401,657, filed December 31, 1953, and assigned to the assignee of the present invention.

The ring counter illustrating features of the invention includes an even number of stages with diagonally opposite stages designated as a complementary pair or set. That is, one stage of a complementary pair or set is "on" or in the "high-conduction" state when the other stage of the complementary pair or set is "off" or in the "low-conduction" state. The stages are further designated as being of the same kind in relation to the two-input signal control. That is, the "odd" stages are under control of a first series of input pulses, while the "even" stages are under control of a second series of alternately-occurring input pulses.

Advancing or rotation of the ring counter is achieved in dependence upon coincidence of signals at the input of the respective bistable transistor stages. Specifically, within the ring counter, internal gating signals are derived from stages other than the stage under control. These internal gating signals are to be coincident with the external control signals applied as stated above to stages of the same kind. Even though the external control signal for the single stage to be switched is applied to all of the other stages of the same kind, only that single stage is in the condition of having all of its input terminals or signal sources of the same kind. An interposed logic component, recognized as an "and" circuit of known function, will render this stage non-responsive, absent the required coincidence signal inputs derived externally and internally of the ring counter. Each stage of the ring counter requires an "and" circuit for controlling triggering, as well as a connection to its complementary stage, such that when one stage of a complementary pair is triggered "on" the other stage of said pair is triggered "off." As a feature of the invention, for accomplishing the two signal input control of the ring counter, circuitry is provided such that control is compatible with optimum circuit conditions for obtaining bistable transistor operation.

Further illustrating aspects of the invention, and as applied to a two-input ring counter employing triode transistors, the bistable characteristic is advantageously obtained by using a relatively low impedance load in the emitter circuit. The two-input control is applied to the respective stages having the aforesaid bistable characteristic by the use of circuit connections which will be recognized as an "and" logic circuit. To special advantage, this two-input control is made effcetive at the base of each of the bistable triode transistor stages. As a further feature, control signal-input may be directly in the low-impedance emitter circuit of the triode switching transistor by specialized input circuitry, which from the standpoint of the input signal presents a relatively high impedance, yet does not simulate a high input load to the switching transistor.

Further illustrating aspects of the invention, the two-input ring counter may be constructed with multiple-emitter current-multiplying transistors. This illustrative application facilitates the required control over the respective transistor switching stages without disturbing the bistable characteristics of the stages. In this illustrative embodiment the two-input ring counter utilizes a special multiple-emitter circuit, wherein one emitter is coupled to the sources of coincidence input signals by a logic component recognized as an "and" circuit for the control or triggering function, and another emitter is arranged to provide the low-impedance load for the desired bistable emitter-input characteristic.

As a further feature of the invention, as applied to both the illustrative triode and multiple-emitter forms of the two-input ring counter, the reset function may be achieved directly and simply by applying control signals at the bases of the respective transistor stages. Additionally, control between complementary or diagonal sets or pairs of stages may be by circuit connections, between the collector of one stage of the pair, and the base of the other stage of the pair.

Figure 2:
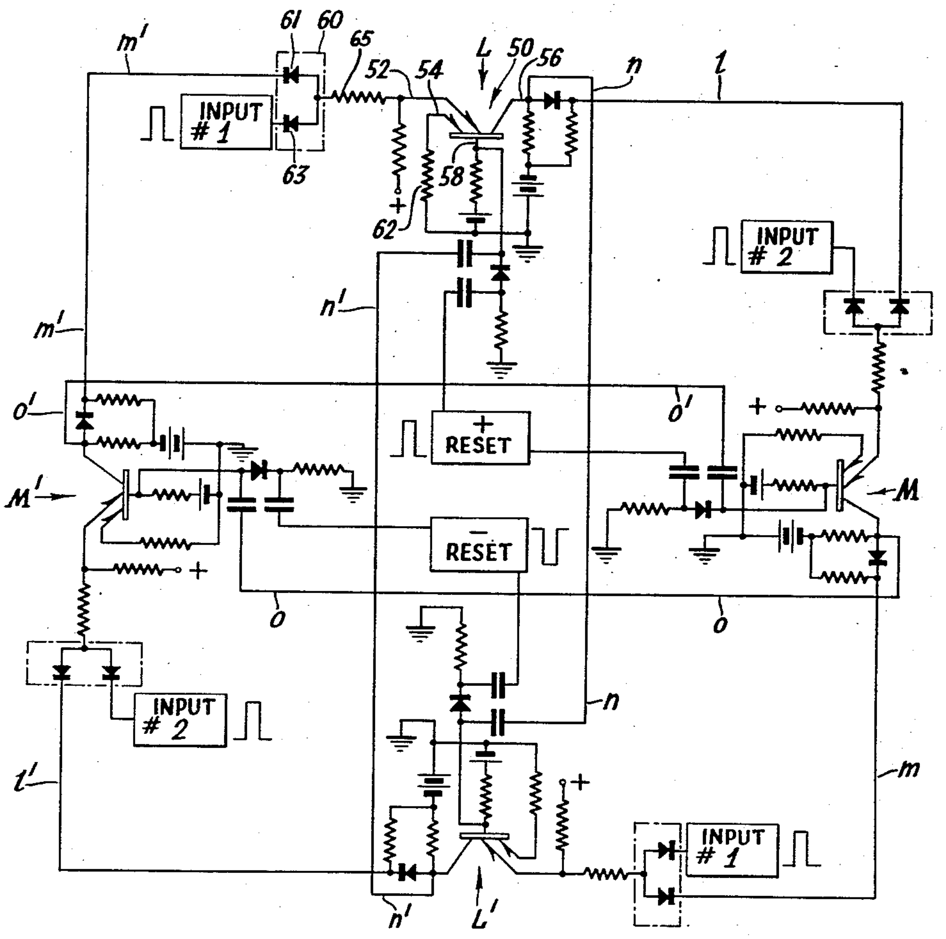

The above as well as other objects, features and advantages of the present invention will become apparent upon reference to the following detailed disclosure of several presently preferred and illustrative embodiments, when taken into conjunction with the accompanying drawing, wherein:

Fig. 1 is a diagrammatic showing of a triode transistor, two-input ring counter embodying features of the present invention; and, Fig. 2 is a diagrammatic showing of a tetrode transistor, two-input ring counter embodying still further features of the present invention.

Specific reference will now be made to the drawings, showing illustrative two-input ring counters, each having four transistor switching stages. The invention will be described as applied to these relatively simple four-stage ring counters, it being understood that any number of even stages may be employed by following the concepts set forth herein. As previously pointed out, two-input ring counters generally do not depend upon the shape or duration of the input pulses. This special feature is of extreme importance in large scale calculators, inventory controls and the like since the counter should be as insensitive as possible to changing values and characteristics of the components. Although illustrative applications of the ring counters are not shown, their many uses are well understood, per se.

For a four step or stage two-input ring counter, the different stages of the ring after stepwise advance under the multiple-signal control are listed in the table set forth below:

| State | Stage 1 | Stage 2 | Stage 3 | Stage 4 |
|---|---|---|---|---|
| | (Stage A) (Stage L) | (Stage B) (Stage M) | (Stage A') (Stage L') | (Stage B')—(Fig. 1) (Stage M')—(Fig. 2) |
| 0 | low | low | high | high. |
| 1 | high | low | low | high. |
| 2 | high | high | low | low. |
| 3 | low | high | high | low. |

It will be appreciated that stages 1 and 3 and stages 2 and 4 are respectively complementary or diagonal pairs, that is when stage 1 is in the "on" or "high-conduction" state, stage 3 will be in the "off" or "low conduction" state. The sequence of operation of the ring counter is such that when the first control signal or pulse is applied to the input of stage 1, the ring counter will change from the "even" or "zero" state to its subsequent "odd" or "first" state. When the second and alternatively-occuring control signal is applied to stage 2, the ring counter will change from the "first" or "odd" state to the subsequent "second" or "even" state. It follows that, starting from any state, the next successive state may be obtained by application of the control input.

Referring now specifically to Fig. 1, there is shown a ring counter embodying triode transistor switching stages. Four identical bistable switching stages, A, B, A', B' are connected in ring fashion with the even stages A, A', providing one complementary or diagonal pair, and the odd stages B, B', providing the other complementary or diagonal pair. Each switching stage embodies a bistable circuit including a current-multiplication triode transistor 10 having an emitter electrode or connection 12, a collector electrode or connection 14, and a base electrode or connection 16.

In an illustrative form, the triode transistor 10 incorporates a semiconductor crystal of N-type material which is triggered from the "low-conduction" stable state to the "high-conduction" stable state by application of a positive control pulse to the emitter 12, or by application of a negative input or control pulse to the base 16. Conversely the N-type triode transistor 10 may be triggered from the "high conduction" or "on" stable state by application of a negative pulse to the emitter 12, or by application of a positive pulse to the base 16. It will be appreciated that the signs of these control pulses will be reversed for a switching transistor incorporating a P-type semiconductor with appropriate changes in the biasing conditions. In this form of the invention, base control for switching the transistor 10 is preferable in that the respective control signals do not interfere with obtaining the required bistable characteristic. A relatively low linear impedance 18 is incorporated in the emitter-base circuit. For the illustrated N-type triode transistor 10, a positive base potential supply 20 is provided in series with a base resistor 22, and a negative collector potential supply 24 is provided in series with a load 26. The illustrated bistable transistor switching circuit is of the well known type having a negative resistance region in its input characteristic, for example, as detailed in my copending application Serial No. 415,851, filed March 12, 1954, now Patent No. 2,901,638, issued August 25, 1959.

The load impedance 22 connected to the collector circuit and the base 16 constitutes a common return connection for the emitter and collector. The technique of proportioning the foregoing circuit so as to be bistable is well known and in such operation, two stable operating points are established in the low positive-resistance high-current region of the input or emitter characteristic, and the high positive-resistance low-current region of the characteristic, with an intervening negative resistance region. As detailed in my application Serial No. 415,851, filed March 12, 1954, a low-resistance region may be made stable even though it is not in the positive resistance portion of the characteristic.

The output of each of the stages, designated respectively by letters *a*, *b*, *a'*, *b'*, are each effectively decoupled from their inputs by an isolating circuit including a series diode 28 and a bleeder resistor 30 shunting the load 26. The respective outputs, as will subsequently be appreciated, are used as gating or control signals for the inputs of further stages. Further outputs *c*, *d*, *c'*, *d'* are derived at the collectors which are effectively isolated against interaction with outputs *a*, *b*, *a'*, *b'* and are employed as a control for the complementary stages of the ring counter.

When the transistor circuit 10 is "on" or in the "high-conduction" state, current is drawn through resistor 26 which renders the collector less negative than the potential of source 24. The output terminal *a* drops to the less-negative potential since the diode is polarized to be conducting for this condition. When the transistor circuit 10 is in the low-conduction state, the diode acts to isolate the relatively low collector load resistor from the output side of that diode.

Control signals are applied to the base 16 of the triode transistor 10 from a logical "and" circuit 32 which is coupled to the base 16 via a condenser 34. The "and" circuit 32 is constructed on the "low" convention and applies a signal to the base 16 only if there is coincidence of negative input pulses to its respective diode arms 33, 35. The control signals for the "and" circuit 32 are derived from one of the two alternately-occurring input signal sources (conventionally used for operating a two-input ring counter) which may be derived from a common alternating source, and the requisite number of gating signals derived internally of the ring counter. The "and" circuit 32, having its branch 33 connected to external signal input #1, and having its branch 35 connected to input *b*, has a common output 37 connected through the series condenser 34 to the base 16 of the switching transistor 10. A shunt resistance 39 is connected to an appropriate source of potential such that when only one of the inputs to the diode branches 33, 35 exceeds the switching level, the potential at the output 37 is not sufficiently negative to switch the circuit 10 to the "on" or "high-conduction" state. Switching occurs upon coincident negative inputs at the diode branches 33, 35, as is well understood.

The transistor switching stages A, B, A′, B′, are restored to the "off" or "low-conduction" stable state by applying positive pulses in the base circuits of the respective transistor switching circuits. Specifically, as applied to stage A, provision is made for control from the complementary stage A′ by collector terminal *c′* and a coupling condenser 36 connected to the base of the stage A. Clearing or resetting of stage A to the "zero" state, normally designated as the starting position, is accomplished by application of reset pulses to the base via a condenser 38 and a bleeder resistor 40. Both the reset input and the complementary stage input C′ are positive, the respective inputs being isolated from each other so that their actions are individually effective by provision of a decoupling diode 42 which is polarized to be forward conducting for the reset input pulses.

Each of the remaining stages B, A′, and B′ are similar in internal circuitry as stage A. However, it will be recalled that at the outset stages A and B are to be "off," whereas stages A′ and B′ are to be "on" in consequence of which positive reset pulses are supplied to stages A and B, while negative reset pulses are supplied to stages A′ and B′. Isolating diodes 42 in stages A and B are polarized alike as described while the isolated diodes 42′ in stages A′ and B′ are polarized in the opposite sense to take into account the reverse polarity of the reset pulses applied to stages A′ and B′. Accordingly, for the present purposes, it will suffice to merely describe the external circuit connections between the respective stages.

As previously pointed out, the "and" circuit input to the stage A includes signal input #1 derived externally of the ring counter, and an internally derived gating signal applied at terminal *b* and derived from the isolated output *b* of stage B. The reset signal, applied via condenser 38 to the base is derived from an external source of reset signals applied to all of the stages, while the signal applied to terminal *c′* is derived from the collector of the complementary or diametrically opposite stage A′, of the illustrated ring counter.

As to stage B, signal input #2 is applied to one of the input terminals which signal occurs concurrently with an internally-derived gating signal applied to the terminal *a′* from the isolated output of the next succeeding stage A′. Once again reset signals are applied from the common external source. Stage B is effectively coordinated with its complement diametrically opposite stage B′ by a further positive base input at terminal *d′*, derived from the collector circuit of stage B′.

Stage A′ is complementary to stage A. This even stage derives its external control from signal input #1 which occurs concurrently with an internally derived gating signal applied at terminal *b′* and derived from the isolated output *b′* of the next succeeding stage B′. Reset pulses are applied in the base circuit of stage A′, as previously described. A control signal is applied at the terminal *c* which is derived from the collector circuit of stage A.

Stage B′ is complementary to stage B. This odd stage derives its external control signal from input #2, which occurs concurrently or coincidentally with the internal gating signal applied at the terminal *a* and derived from the isolated output of stage A. Once again reset pulses are applied in the base circuit for clearing this stage, and a control signal is applied at terminal *d* which is derived from the collector circuit of stage B.

From the description of the interconnection between the respective stages, it will be appreciated that the various terminals and leads designated by the lower case letters correspond to other, and that the respective stages are connected in ring fashion with further interconnections between the complementary pairs or stages A, A′ and B, B′. The required interconnection between the stages of the ring counter become apparent from a consideration of the conduction state chart set forth previously. For ring counters including a different number of stages, it is merely necessary to establish a chart showing the conduction of the stages of the ring counter in its various states. In each instance, the required number of coincident and internally-derived gating pulses, as well as the interconnection between the diametrically opposite stages will be apparent in view of the disclosure herein. It is to be expressly understood that the invention not only contemplates the illustrated four stage ring counter, but equally includes further ring counters constructed in accordance with the principles aforesaid.

A typical cycle of operation will now be described in detail, such that the interaction between the ring counter stages will be apparent. In considering the description to follow, reference should be made to the conduction state chart previously set forth.

In state "zero" stages A and B are in the "low-conduction" state, while stages A′ and B′ are in the "high-conduction" state. To advance the ring counter to state "1" in response to the alternately-occurring and negative two-input control, stage A must be switched to the "high-conduction" state, stage B must remain in the "low-conduction" state, stage A′ must be switched to the "low-conduction" state, and stage B′ must remain in the "high-conduction" state.

Stage A is switched due to coincidence in input at the "and" circuit 32. Specifically, during this transistion an input pulse from source #1 is coincident with a steady negative potential at input *b* derived from the isolated output of stage B, since the latter remains in the "low-conduction" state. The coincidence negative signal inputs to the "and" circuit 32 produces a negative pulse at the output 37 which is applied to the base 16 of the bistable switching circuit 10. This causes stage A to be switched from the "low-conduction" state to the "high-conduction" state.

As to stages B and B′ there are no external control signals applied to these stages during the interval in which signals are applied from input #1 to stages A, and A'. Further, complementary stages B, B' do not produce pulse output at their collector terminals, so that there is no pulse input to d' and d.

As to stage A', there is no coincidence signal input for switching. Although externally-derived signals are applied from input #1 to its "and" circuit, a gating potential is not available from the isolated output b' of stage B' which remains in the "high-conduction" state during this transistion. However, during switching of stage A from state "zero" to state "1," a positive pulse is derived at the collector output terminal c, which is applied at the corresponding input terminal c in the base circuit of stage A'. This positive signal is effective in stage A' to switch its bistable circuit, which was in the "high-conduction" state during state "zero," to the "low-conduction" state. The output at terminal c', produce incident to switching of stage A' from "high" to "low" is a negative pulse transmitted via condenser 36 to base 16. This is cumulative since it is of the same sign and timing as the "on" signal input to stage A.

In summary, stage A is switched to its "high-conduction" state, stage B remains in the "low-conduction" state, stage A' is switched from the "high-conduction" state to the "low-conduction" state, and stage B' remains in the "high-conduction" state. Accordingly, the ring counter arrives at conduction state "1," as illustrated in the aforesaid chart, and is effectively rotated one step.

A number of changes occur which may warrant discussion in that they are taken into account without disturbing the foregoing circuit operation. An output pulse is developed at collector c' of stage A'. This output pulse is negative and accordingly is of a sense to be transmitted by diode 42 and, from this diode through condenser 38 in stage A and into condenser 38 of stage B where both stages A and B have a common reset source. However, stage B has a diode 42 which is polarized to pass only positive pulses from its associated condenser 38. Consequently these negative pulses, originating at collector c' have no adverse effect in the reset channel.

A negative pulse as developed at collector c' might be transmitted from isolated output point a' but for the interposed diode that is polarized to pass only positive pulses.

When stage A is switched from "off" to "on" as described a positive pulse is transmitted via diode 28 to input point a of stage B'. This input is ineffectual at stage B' for lack of an input pulse from the external source of input #2.

The further description of the operation of circuit of Fig. 1 will not be complicated by discussion of possible disturbing potentials because the circuit shown takes all such possibilities into account.

During the next signal interval, an input signal from input "#2" is effective at the input connections to complementary stages B, B'. At stage B, which is to be switched from the "low-conduction" state to the "high-conduction" state, there is coincident signal input to its "and" circuit. This is due to the signal from input "#2" and the gating potential derived from the isolated output of stage A' that is "off" during this transition.

Stage B', likewise receiving external signal input from source #2, is not effected by said input in that no internally-derived gating potential is present at terminal a. This can be appreciated when it is observed that stage A remains in the "high-conduction" state during this transition. However, stage B' is switched from the "high-conduction" state to the "low-conduction" state by the application of a positive control signal at terminal d, which is produced in the collector circuit of the complementary stage B, as stage B is switched from the "low-conduction" state to the "high-conduction" state.

In summary, in the transition from state "1" to state "#2," stage A remains in the "high-conduction" state, stage B is switched from the "low-conduction" state to the "high-conduction" state, stage A' remains in the "low-conduction" state, and stage B' is switched from the "high-conduction" state to the "low-conduction" state.

From the foregoing description of the switching action for each of the two signal inputs, the switching pattern of the illustrative four-stage, two-input ring counter should be fully appreciated. It will be observed that the ring is advanced stepwise in one direction by turning on the first or leading "off" stage, and turning off the first or leading "on" stage. The interaction between complemental or diametrically opposite pairs is such that when one stage of a pair is switched on, its complement is switched off.

When the number of ring counter stages is increased, the arrangement and operation are substantially in accordance with the foregoing description. Each collector supplies input bias to the "and" circuit of the preceding stage and each collector further provides pulse output when its conduction state is changed for control over its complement and diametrically opposite stage. Accordingly, the added stages will increase the number of stages that remain unaffected during the transition intervals when a "high-conduction" stage is switched off and when the complemental diametrically opposite "off" stage is switched on.

Referring now to Fig. 2, there is shown a two-input ring counter illustrating the use of multiple-emitter or tetrode transistor switching stages. Four identical bistable switching stages L, M, L', M', are connected in ring fashion, the illustrative form including four stages with the even stages L, L' providing one complementary or diametrically opposite pair, and the odd stages, M, M' providing the other complementary or diametrically opposite pair. Each switching stage embodies a bistable circuit including a current-multiplication tetrode transistor 50 having a semiconductor body of N-type material, as previously described in great detail, or a semiconductor body of P-type material with appropriate changes in the biasing conditions. In this illustrative form of the invention, control signal input is applied in the emitter circuit of the transistor in a manner contemplated to avoid disturbing the bistable switching characteristics. The bistable characteristic of the tetrode transistor 50 is obtained in accordance with well understood principles, as detailed in my aforementioned copending applications, by a relatively low emitter impedance 62 connected to one emitter electrode 54 and having a common return to the base electrode 58. The load impedance 62 is selected such that two stable operating points are established in the low positive resistance region of the emitter characteristic and the high positive resistance region of the characteristic, with an intervening negative resistance region.

Control signals are applied in the emitter circuit 52 of the tetrode transistor 50 through an isolated control circuit 60. Specifically, the isolated control circuit 60 is recognized as an "and" logic circuit having diode arms or branches 61, 63, as described in detail before, connected from a common terminal through a series resistance 65 to the emitter electrode 52. In this embodiment, emitter control is employed for turning "on" or triggering the tetrode transistor. This "on" control is derived in response to application of a positive signal or pulse to the emitter electrode 52, which positive signal occurs only upon coincident positive inputs to the respective diode arms 61, 63 of the "and" circuit 60. The control or "and" circuit 60 is designed on the high convention, that is there is a signal output to resistor 65 only upon occurrence of positive input signals at the respective diode arms. When either of the inputs to the "and" circuit 60 is at the "off" potential, the associated diode branch causes the output of the "and" circuit to be insufficient to switch the transistor from the "low-conduction" condition to the "high-conduction" condition. However, when both of the diode branches have the required positive "on" potential individually applied thereto, there will be a relatively small potential dropped across the respective diodes and the output applied to the emitter 52 is sufficient to cause switching. Control signal injection at the emitter 52 is effectively isolated from the emitter 54 and permits the selection of the input control circuits to present a relatively high load without interfering with bistable operation through provision of the relatively low impedance 62 in the emitter circuit 54. The presence of the emitter 54 in series with the load impedance 62 assures continuous injection of minority carriers to the switching transistor 50 independent of the impedance conditions at the input to the emitter 52. Consequently, it is unnecessary to provide a low impedance emitter circuit at emitter 52 in obtaining bistable operation, where such low impedance would be required in the absence of emitter 54.

Once again, interconnection is provided between the complementary stages L, L′ and M, M′ such that switching "on" of one of the stages causes switching "off" of the other stage of the complementary pair. Specifically, this is achieved by connecting the collector output *n* of stage L to the corresponding base control terminal *n* of stage L′; conversely, the collector output *n′* of stage L′ is connected to the corresponding base control terminal *n′* of stage L. As was previously described, this application of positive signals to the base circuits of the respective transistors will cause switching from the "high-conduction" stable state to the low-conduction "stable" state. Similarly, stages M and M′ are interconnected by joining the collector output terminal *o′* of stage M′ to the corresponding base terminal *o′* of stage M, and connecting the output terminal *o* of stage M to the corresponding base control terminal *o* of stage M′.

Two alternating series of inputs are applied at the input terminals of the ring counter, specifically, input "#1" being applied to "even" stages L, L′ and input "#2" being applied to "odd" stages M, M′.

The gating signals for the respective stages are obtained as previously described. Briefly, stage L receives an internal gating signal from the isolated output terminal *m′* of stage M′; stage M receives an internal gating signal from the isolated output terminal *l* of the stage L; stage L′ receives an internal gating signal from the isolated output terminal *m* of stage M; and, stage M′ derives its internal gating signal from the isolated output terminal *l′* of stage L′.

Once again the sequence of operation of the illustrated counter is such that when a positive pulse is applied at the respective "#1" inputs, the ring counter will change from an "even" stage to its subsequent "odd" stage. When a positive pulse is applied to the respective "#2" inputs, the ring counter will change from an "odd" stage to its subsequent "even" stage. Further, and as is understood, starting from any state, when pulses of the proper polarity are applied to the respective reset terminals, the ring counter will be set to the state "zero."

Briefly, the operation of the multiple emitter ring counter illustrated in Fig. 2 will be described, it being appreciated that this operation is very similar to that described in conjunction with Fig. 1.

Initially, pulses of proper polarity are applied to the respective reset terminals which are effective at the base connections of the respective switching stages, such that the ring counter is reset to the "zero" state. Specifically, stages L, M, are turned "off" by means of a positive pulse and stages L′, M′ are turned "on" by means of a negative pulse.

In advancing from state "zero" to state "1," the isolated outputs *l* and *m* are low and correspond to an "off" signal, while the isolated outputs *l′*, *m′* are comparatively high and correspond to an "on" signal. Upon occurrence of a positive pulse at "#1" inputs to stages L, L′ coincidently the requisite gating signal is derived from terminal *m′*, and the output of the "and" circuit 60 will become high. Thus the tetrode transistor 50 of stage L is switched and returns to the "on" or "high-conduction" state, and its output changes from low to high. This change in the output at terminal *n* passes as a positive pulse to the base of the complementary stage L′ and switches this stage from the "on" condition to the "off" condition. Thus the counter has changed from state "zero" to state "1."

Similarly, when a positive pulse is applied to input "#1" of complementary stage L′, the ring counter will change from state "2" to state "3" due to the coincidence of input "#1" and the positive gating signal *m* derived from the isolated output of the preceding counter stage M.

Considering complementary stages M and M′, a positive pulse applied at inputs "#2" will change the ring counter from state "1" to state "2," or from state "3" to "zero." This is due to coincidence of high values at input "#2" and the internally-derived gating signal at the isolated outputs *l*, *l′*.

The many applications of both of the illustrative forms of the invention, and of further ring counters embodying the invention should be apparent from the foregoing description, especially in the fields of automation and cybernetics.

From the foregoing disclosure of two specific illustrative embodiments of the invention, those skilled in the art will readily find varying applications of the invention and various further modifications thereof will be readily apparent. Accordingly, the appended claims should be interpreted broadly, consistent with the spirit and scope of the invention.

What is claimed is:

1. A ring counter rotatable by alternately-occurring first and second series of advance pulses comprising an even number of transistor switching stages connected in ring fashion, each of said stages including a current-multiplying transistor in a circuit having a bistable input characteristic and two stable conduction states, input connections to odd stages only, input connections to even stages only, means interconnecting diametrically opposite odd stages and similar means interconnecting diametrically opposite even stages as respective complementary sets and arranged to switch one stage of said complementary set from one to the other of said stable conduction states in response to switching of the other stage from said other to said one of said stable conduction states, the input connections to said odd stages including gating means, means controlled by the conduction state of said even stages for applying gating signals to the gating means of said odd stages the gating means of said odd stages being arranged to provide a switching signal only upon coincidence of a gating signal and an advance pulse at the gating means, the input connections to said even stages also including gating means, and means controlled by the conduction state of said odd stages for applying gating signals to the gating means of said even stages, the gating means of said even stages being arranged to provide a switching signal only upon coincidence of a gating signal and an advance pulse at the gating means of said even stages.

2. A ring counter comprising plural pairs of switching stages connected in ring fashion, each of said switching stages including a transistor circuit having a bistable input characteristic and two stable operating states, means interconnecting diametrically opposite odd stages and similar means interconnecting diametrically opposite even stages as respective complementary sets arranged for switching one stage of a set to one stable state in response to switching of the other stage of the set to the other stable state, and "and" logic circuit connected to each of said stages, control signal supply means for producing alternately occurring first and second series of advance pulses, input connections to the "and" logic circuits of odd stages only of said ring counter for applying the first series of advance pulses, input connections for applying the second series of advance pulses to the "and" logic circuit of even stages only of said ring counter, individual means under control of each of the even stages for producing gating signals at the "and" logic circuits of selected odd stages, and individual means under control of each of the odd stages for producing gating signals at the "and" logic circuits of selected even stages, each "and" logic circuit being arranged to provide a switching signal for the associated transistor only upon coincidence at its input of an advance signal and a gating signal.

3. A ring counter comprising plural pairs of switching stages connected in ring fashion, each of said switching stages including a transistor circuit having a bistable input characteristic and two stable operating states, said transistor circuit including a collector circuit having two signal output points separated by isolating means, means interconnecting diametrically opposite odd stages and similar means interconnecting diametrically opposite even stages as respective complementary sets and controlled from one of said signal output points arranged for switching one stage of a set to one stable state in response to switching of the other stage of the set to the other stable state, a gating means connected to each of said stages, external signal supply means for producing alternately occurring first and second series of input pulses, input connections for applying the first series of input pulses to the gating means of odd stages only of said ring counter, input connections for applying the second series of input pulses to the gating means of even stages only of said ring counter, individual means controlled from the other signal output point of even stages for producing gating signals at the gating means of selected odd stages, and individual means controlled from the other signal output point of said odd stages for producing gating signals at the gating means of selected even stages each of said gating means being arranged to provide a switching signal for the associated stage only upon coincidence of a gating signal and an input pulse at the gating means.

4. A ring counter comprising plural pairs of switching stages connected in ring fashion, each of said switching stages including a triode bistable transistor having a base control circuit and a collector output circuit, means interconnecting the collector and base circuits of diametrically-opposite odd stages and similar means interconnecting the collector and base circuits of diametrically opposite even stages as respective complementary sets and arranged to switch one stage of a set to one stable conduction state in response to switching of the other stage of the set to the other stable conduction state, a gate circuit connected to the base control circuit of each of said stages, external supply means for producing alternately-occurring first and second series of input pulses, input connections for applying the first series of input pulses to the gate circuits of odd stages only of said ring counter, input connections for applying the second series of input pulses to the gate circuits of even stages only of said ring counter, individual means from the collector output circuit of each of the even stages for producing gating signals at the gate circuits of selected odd stages, and individual means from the collector output circuit of each of the odd stages for producing gating signals at the gate circuits of selected even stages, each of said gating circuits being arranged to provide a switching signal to the base control circuit of the associated transistor only upon coincidence of a gating signal and an input pulse at the gating circuit.

5. A ring counter comprising plural pairs of switching stages connected in ring fashion, each of said switching stages including a bistable tetrode transistor circuit having two emitter connections, one of said emitter connections being arranged to provide the bistable operating characteristic, means interconnecting diametrically-opposite odd stages and similar means interconnecting diametrically opposite even stages as respective complementary sets arranged for switching one stage of a set to one stable state in response to switching of the other stage of the set to the other stable state, a gating means connected to the other emitter connection of each of said stages, external supply means for producing alternately-occurring first and second series of input pulses, signal input means for applying the first series of input pulses to the gating means of odd stages only of said ring counter, signal input means for applying the second series of input pulses to the gating means of even stages only of said ring counter, individual means under control of each of the even stages for producing gating signals at the gating means of selected odd stages, and individual means under control of each of the odd stages for producing gating signals at the gating means of selected even stages, each of said gating means being arranged to provide a switching signal to the other emitter connection of the associated transistor only upon coincidence of a gating signal and an input signal at the gating means.

6. A ring counter including a plurality of bistable switching stages each having two stable operating points, each of said stages including a transistor, an emitter circuit and a collector circuit all proportioned to have an emitter characteristic including a negative resistance region between a low-current positive resistance region and a high-current positive resistance region, a gate circuit connected to each of said stages, input connections from a first source of advance signals to the gate circuit of each odd stage only of said counter, input connections from a second source of advance signals to the gate circuit of each even stage only of said counter, coordinating means interconnecting diametrically opposite odd stages and similar means interconnecting diametrically opposite even stages of said counter as complementary pairs, said coordinating means being responsive to a control signal derived from one stage of a pair to switch the other stage of the pair to an operating point which is the complement of the operating point of said one stage, means for applying gating signals from each of said odd stages to the gate circuit of a selected even stage, and means for applying gating signals from each of said even stages to the gate circuit of a selected odd stage, each gate circuit being arranged to provide a switching signal for the associated transistor only upon coincidence of a gating signal and an advance signal at the gate circuit.

7. A ring counter including a plurality of bistable switching stages each having two stable operating points, each of said stages including a triode transistor, an emitter circuit and a collector circuit, all proportioned to have an emitter characteristic including a negative resistance region between a low-current positive resistance region and a high-current positive resistance region, a gate circuit connected to the base of each stage, input connections from a first source of advance signals to the gate circuit base of each odd stage only of said counter, input connections from a second source of advance signals to the gate circuit of each even stage only of said counter coordinating means interconnecting diametrically opposite odd stages and similar means interconnecting diametrically opposite even stages of said counter as complementary pairs, said coordinating means being responsive to a control signal derived in the collector circuit of one stage of a pair to switch the other stage of the pair to an operating point which is the complement of the operating point of said one stage, means for applying gating signals from each of said odd stages to the gate circuit of the preceding even stage, and means for applying gating signals from each of said even stages to the gate circuit of the preceding odd stage, each gate circuit being arranged to provide a switching signal at the base of the associated transistor only upon coincidence of a gating signal and an advance signal at the gate circuit.

8. A ring counter including a plurality of bistable switching stages, each of said stages including a tetrode transistor, a first emitter circuit and a collector circuit all proportioned to have an emitter characteristic including a stable low-current operating point and a stable complemental high-current operating point, a gate circuit connected to the second emitter circuit of each stage, input connections from a source of advance signals to the gate circuit of each odd stage only of said counter, input connections from a further source of advance signals to the gate circuit of each even stage only of said counter, coordinating means interconnecting diametrically-opposite odd stages and similar means interconnecting diametrically opposite even stages of said counter as complementary pairs, said coordinating means being responsive to a control signal derived from one stage of a pair to switch the other stage of the pair to an operating point which is the complement of the operating point of said one stage, means for applying gating signals from each of said odd stages to the gate circuit of the succeeding even stage, and means for applying gating signals from each of said even stages to the gate circuit of the succeeding odd stage, each gate circuit being arranged to provide a switching signal at the second emitter of the associated transistor only upon coincidence of a gating signal and an advance signal at the gate circuit.

References Cited in the file of this patent

UNITED STATES PATENTS

| | | |
|---|---|---|
| 2,379,093 | Massonneau | June 26, 1945 |
| 2,551,119 | Haddad et al. | May 1, 1951 |
| 2,605,306 | Eberhard | July 29, 1952 |
| 2,622,212 | Anderson et al. | Dec. 16, 1952 |
| 2,644,887 | Wolfe | July 7, 1953 |
| 2,644,897 | Lo | July 7, 1953 |
| 2,735,005 | Steele | Feb. 14, 1056 |
| 2,772,370 | Bruce et al. | Nov. 27, 1956 |

OTHER REFERENCES

Proc. of IRE, August 1948, vol. 36, No. 8 pages 1030–1034, "Megacycle Stepping Counter," by Leslie.